United States Patent [19]

Whitt

[11] Patent Number: 5,124,116
[45] Date of Patent: Jun. 23, 1992

[54] GRID KEY FOR EXTERIOR GRID CELLS

[75] Inventor: Jeffrey S. Whitt, Lynchburg, Va.

[73] Assignee: B&W Fuel Company, Lynchburg, Va.

[21] Appl. No.: 726,094

[22] Filed: Jul. 5, 1991

Related U.S. Application Data

[62] Division of Ser. No. 645,156, Jan. 24, 1991, Pat. No. 5,061,437.

[51] Int. Cl.$^5$ .............................................. G21C 3/34
[52] U.S. Cl. ................................. 376/438; 376/261; 376/462; 376/442
[58] Field of Search ............... 376/438, 442, 462, 261, 376/439, 433, 436, 446, 441; 976/DIG. 77, DIG. 78, DIG. 79, DIG. 80; 29/906, 723

[56] References Cited

U.S. PATENT DOCUMENTS

| | | | |
|---|---|---|---|
| 3,933,583 | 1/1976 | Jabsen | 376/438 |
| 4,651,403 | 3/1987 | DeMario et al. | 29/450 |
| 5,061,437 | 10/1991 | Whitt | 376/438 |
| 5,068,081 | 11/1991 | Oyama et al. | 376/261 |

Primary Examiner—Brooks H. Hunt
Assistant Examiner—Meena Chelliah
Attorney, Agent, or Firm—Robert J. Edwards; D. Neil LaHaye

[57] ABSTRACT

A grid key and method for keying exterior grid cells in a nuclear fuel assembly. The grid key has a main body portion having first and second ends and is bent at approximately a 45 degree angle near the first end. Two tabs extend outward from the first end at a right angle to the main body portion to define a T-shape. The T-shaped end is inserted into the window of the exterior grid strip such that the top of the T-shape is parallel to the longitudinal axis of the grid assembly. The main body portion is then rotated 90 degrees to position the top of the T-shaped end to be perpendicular to the longitudinal axis of the grid assembly and behind the exterior grid strip. The main body portion is then pulled away from the exterior grid strip in a vertical rotating motion, causing the top of the T-shaped end to pull the exterior grid strip away from the center of the cell defined by the grid assembly.

1 Claim, 2 Drawing Sheets

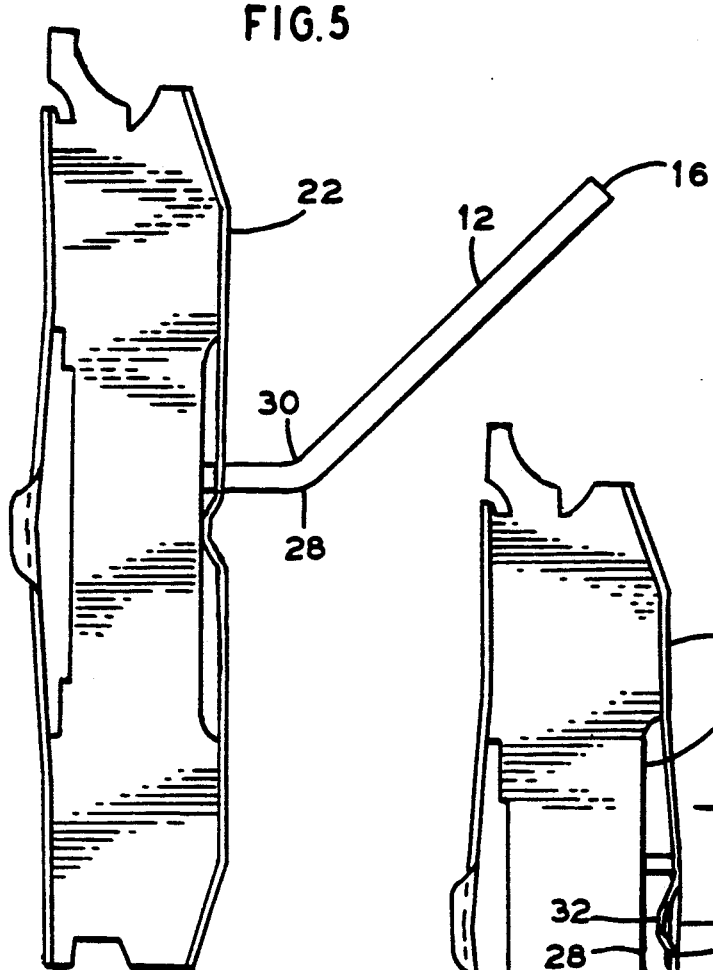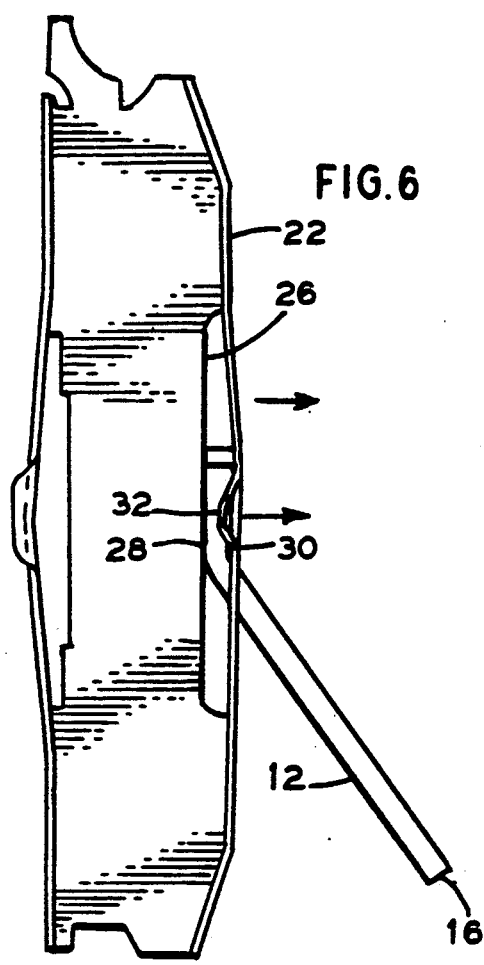

GRID KEY FOR EXTERIOR GRID CELLS

This application is a division of application Ser. No. 07/645,156, now U.S. Pat. No. 5,061,431, filed Jan. 24, 1992.

BACKGROUND OF THE INVENTION

1. Field of the Invention

The present invention is generally related to nuclear fuel assemblies and, in particular to an apparatus and method of loading fuel rods into exterior grid cells of the fuel assembly.

2. General Background

Grids used in commercial nuclear fuel assemblies are fabricated with stops that grip the fuel rods in place when the fuel assembly is in the as-built condition. During fuel assembly fabrication the stops are withdrawn away from the centerline of each grid cell to allow free passage of the fuel rod into and through the grid. Keying of the stops to cause them to withdraw from the centerline of their grids is typically performed using a rectangular wire that is inserted into and through the windows of the grid. The wire key extends through the full width of the grid and is rotated so that the thickest cross-section of the key wedges the strip section backward and thus withdraws the stop. The key is machined with cutouts to preclude interference with the fuel rods when in the rotated position. On some grid designs the rectangular wire key cannot be used to withdraw the stops located on the exterior grid strip. This restriction is typically caused by a grid corner design that does not allow for adequate passage of the rectangular wire through the corner window. In these cases, an alternate key design or fabrication process is required. A known design uses a machined bar with small keys attached to it by the use of snap rings. The bar seats on the outside surfaces of the grid and the keys (two turned diameters with flats milled on the larger diameter 180 degrees apart) are lined up with the grid window openings. Another fixture is then used to spring the grid strips to an open position and the keys are rotated to catch under the exterior grid strip edges. Patented devices related to nuclear fuel assemblies and the loading of fuel rods which applicant is aware of include the following.

U.S. Pat. No. 3,933,583 discloses a grid structure having elongated slots intermediate and normal to the longitudinal edges of each of the strips at each intersection of the strips whereby the slots form openings in each corner of each passageway.

U.S. Pat. No. 4,651,403 discloses the use of a plurality of elongated corner posts that extend longitudinally between and rigidly interconnecting top and bottom nozzles to form a rigid structural skeleton of the fuel assembly.

U.S. Pat. No. 4,489,037 discloses an automatic channel box fitting position adjusting apparatus to facilitate positional adjustment of a channel box for fitting onto a nuclear fuel assembly.

U.S. Pat. No. 4,747,997 discloses a nuclear fuel rod loader for pulling fuel rods into a fuel assembly skeleton that has a rod gripper with slots defining fingers.

U.S. Pat. No. 4,664,874, No. 4,664,875, and No. 4,667,547 disclose fixtures relating to the insertion and removal of top nozzles.

U.S. Pat. No. 4,800,061 discloses the use of a thin-walled tubular member that envelopes a fuel rod during insertion and is then removed after the fuel rod is inserted into the grid.

The known patents do not address the specific problem of loading fuel rods in exterior grid cells. Therefore, a need exists for a method and tool that will simplify the loading of fuel rods in exterior grid cells.

SUMMARY OF THE INVENTION

The present invention addresses the aforementioned problem in a straightforward manner. What is provided is a method and tool for loading fuel rods in exterior grid cells that can be fabricated in batch processing, is relatively inexpensive to fabricate, requires no assembly and contains no moving parts. A key that works independently in each grid window is placed in an open window of the exterior grid. The key is then rotated 90 degrees in the window so as to be perpendicular to the interior strip that it rests upon. The key is then pulled forward in a motion that causes the wider portion of the key to lift the exterior grid strip section that it comes in contact with. The key is formed from a bar with one end having two rectangular extensions that extend outwardly at a right angle to define a T-shape at the end of the bar. The bar is bent at approximately a 45 degree angle near the T-shaped end. The rectangular extensions of the bar lift the exterior grid strip when the opposite end of the bar is pulled forward.

BRIEF DESCRIPTION OF THE DRAWINGS

For a further understanding of the nature and objects of the present invention reference should be had to the following description taken in conjunction with the accompanying drawings in which like parts are given like reference numerals and wherein:

FIG. 5 is a side view illustrating the invention inserted in an exterior grid strip before lifting the exterior grid strip.

FIG. 6 is a side view illustrating the operating position of the invention in lifting the exterior grid strip.

DETAILED DESCRIPTION OF THE PREFERRED EMBODIMENT

Figure 1:
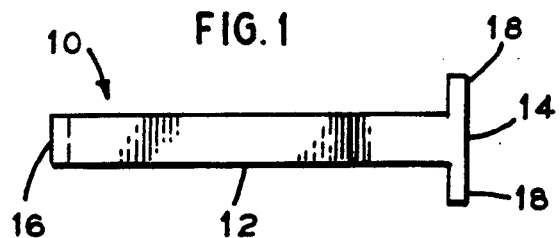
FIG. 1 is a plan view of the invention.
Figure 2:
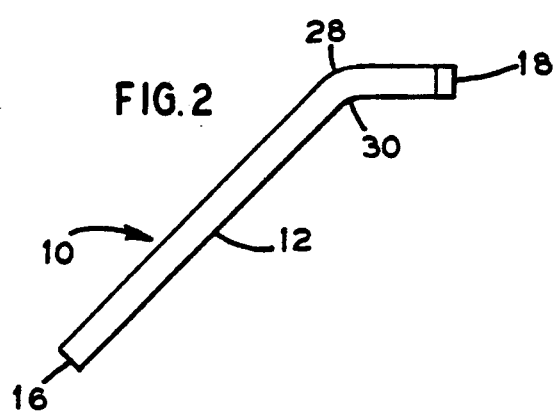
FIG. 2 is a side view of the invention.
Figure 3:
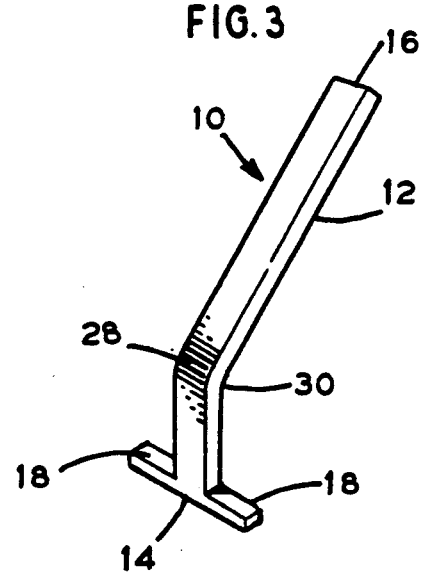
FIG. 3 is a perspective view of the invention.

Referring to the drawings, it is seen in FIG. 1-3 that the invention is generally indicated by the numeral 10. Grid key 10 is formed in the shape of a rectangular bar to provide a main body portion 12 having first and second ends 14, 16. Main body portion 12 is bent near first end 14 to form a 45 degree angle in main body portion 12. In the preferred embodiment the bend in main body portion 12 is approximately 0.19 inch from first end 14 and has a bend radius of approximately 0.09 inch.

First end 14 is provided with two rectangular extensions or tabs 18 that extend outwardly in opposite directions from first end 14 at a right angle to main body portion 12 to define a T-shape at first end 14. In the preferred embodiment tabs 18 are integral with main body portion 12 for ease of fabrication and strength. The following terms will be used for the sake of clarity in referring to the various dimensions of tabs 18 and main body portion 12. The dimension of tabs 18 from first end 14 back toward the bend in main body portion 12 shall be indicated as the length of tabs 18. The dimension across both tabs 18 shall be indicated as the width across tabs 18 with the corresponding dimension across main body portion 12 being indicated as the width of main body portion 12. The thickness of tabs 18 and main body portion 12 is that dimension perpendicular to the width.

Figure 4:
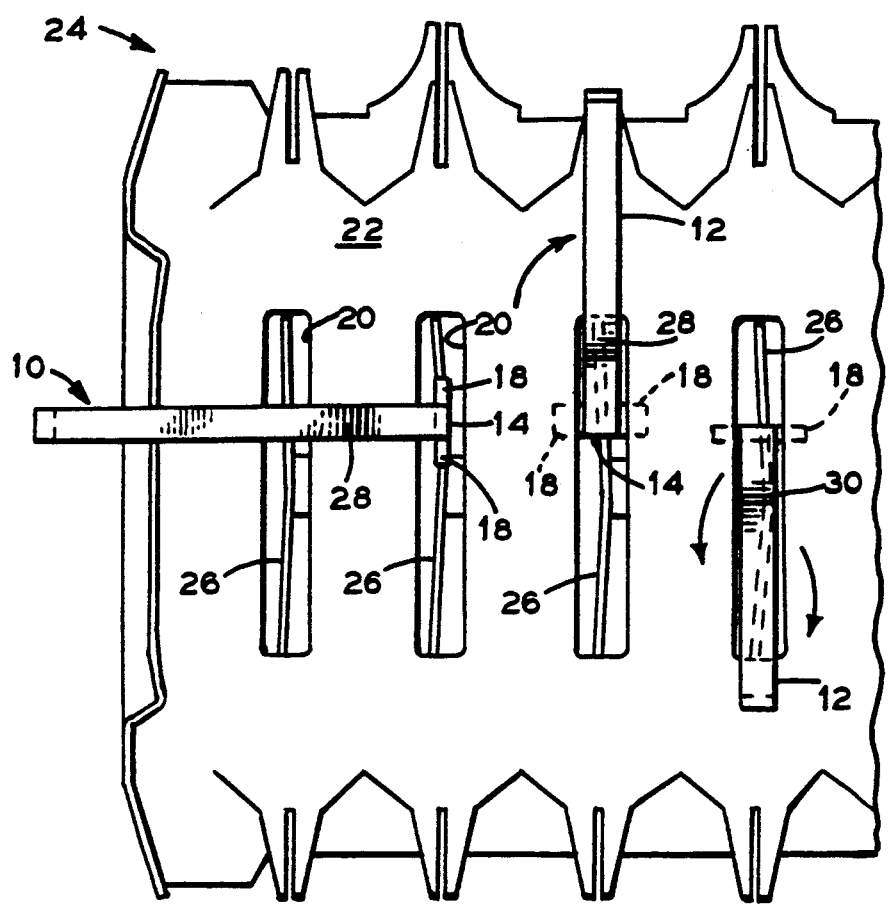
FIG. 4 is a front view illustrating the operation of the invention with an exterior grid strip.

During loading of fuel rods into the exterior grid cells of a fuel assembly grid key 10 is used in the following manner. As seen in FIG. 4, first end 14 is inserted into window 20 of exterior grid strip 22. In this first position tabs 18 are parallel to the longitudinal axis of grid assembly 24, exterior grid strip 22, and interior grid strip 26. Each grid assembly 24 used in a nuclear fuel assembly to position fuel rods radially relative to each other is formed from a plurality of grid strips interleaved together to form cells between the strips that receive the fuel rods. Main body portion 12 is positioned such that the outside radius of the bend in main body portion 12, designated by the numeral 28, faces away from exterior grid strip 22 and the inside radius of the bend, designated by the numeral 30, faces exterior grid strip 24. Main body portion 12 is then rotated 90 degrees to a position where main body portion 12 is parallel with the longitudinal axis of grid assembly 24, tabs 18 are perpendicular to the longitudinal axis of grid assembly 24, and first end 14 is resting on the edge of interior grid strip 26. In this position tabs 18 extend beyond the edge of window 20. Main body portion 12 is then pulled away from exterior grid strip 22 and moved approximately 90 degrees in a vertical rotating motion. As seen in FIG. 5 and 6, this causes outside radius 28 to bear against interior grid strip 26 and tabs 18 to pull exterior grid strip 22 outward as main body portion 12 is moved. As main body portion 12 is moved, this causes rotation of tabs 18 from their first position where their length is between exterior grid strip 22 and interior grid strip 26 to a second position where the thickness of tabs 18 is between exterior grid strip 22 and interior grid strip 26. It is the thickness of tabs 18, which is greater than their length, that provides the camming effect in the keying or lifting of exterior grid strip 22. Dimple 32 on the interior side of exterior grid strip 22 is thus moved away the cell and a fuel rod may then be inserted into the cell without dimple 32 scratching the fuel rod. After a fuel rod is inserted grid key 10 is removed by reversing the steps used to allow insertion of the fuel rod. For ease of illustration only a portion of a grid assembly is shown. Grid key 10 may be formed from any suitable material such as 17-4 ph stainless steel or nylon or other plastics that are strong enough for such use and are easily produced by a molding process. The length and thickness of tabs 18 are adjusted according to the type of grid assembly and the space between interior grid strip 26 and exterior grid strip 22. As an example, in a zircalloy grid tested the dimension of tabs 18 from first end 14 back toward the bend (the length of tabs 18) is preferably 0.035 inch whereas in an inconel grid the preferred dimension is 0.068 inch. The width of main body portion 12 for such grids is 0.100 inch and 0.180 inch respectively while the thickness of main body portion 12 and tabs 18 is 0.059 and 0.078 inch respectively. The width across both tabs 18 for either type of grid is preferably 0.265 inch. The preferred length of main body portion 12 from the bend to second end 16 is 0.75 inch.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for keying exterior grid cells in a nuclear fuel assembly having grid assemblies formed form interleaved grid strips with the grid assemblies forming interior and exterior grid cells, comprising:
   a. inserting a grid key having a T-shaped first end and a main body portion bent at approximately a 45 degree angle into the window of the exterior grid strip of the exterior grid cell such that the top of the T-shaped first end is inside the window and parallel to the longitudinal axis of the grid assembly;
   b. rotating the main body portion of the grid key approximately 90 degrees such that the top of the T-shaped first end is perpendicular to the longitudinal axis of the grid assembly and behind the exterior grid strip;
   c. pulling the main body portion away from the exterior grid strip in a vertical rotating motion to move it approximately 90 degrees to a vertical position whereby the top of the T-shaped first end pulls the exterior grid strip away from the center of its cell defined by the grid assembly.

* * * * *